US010330295B1

(12) United States Patent
Uke

(10) Patent No.: US 10,330,295 B1
(45) Date of Patent: Jun. 25, 2019

(54) SWIVEL LAMP

(71) Applicant: Alan K. Uke, Poway, CA (US)

(72) Inventor: Alan K. Uke, Poway, CA (US)

( * ) Notice: Subject to any disclaimer, the term of this patent is extended or adjusted under 35 U.S.C. 154(b) by 0 days.

(21) Appl. No.: 15/845,716

(22) Filed: Dec. 18, 2017

(51) Int. Cl.

| | |
|---|---|
| ***B60Q 1/26*** | (2006.01) |
| ***F21V 21/30*** | (2006.01) |
| ***F21V 23/04*** | (2006.01) |
| ***F21V 17/10*** | (2006.01) |
| ***F21V 7/06*** | (2006.01) |
| ***F21V 3/00*** | (2015.01) |
| ***F21L 4/00*** | (2006.01) |
| ***F21V 23/06*** | (2006.01) |
| ***F21V 31/00*** | (2006.01) |
| ***F21V 21/088*** | (2006.01) |
| ***F21V 19/00*** | (2006.01) |
| *F21Y 115/10* | (2016.01) |

(52) U.S. Cl.
CPC .............. *F21V 21/30* (2013.01); *F21L 4/005* (2013.01); *F21V 3/00* (2013.01); *F21V 7/06* (2013.01); *F21V 17/107* (2013.01); *F21V 19/0015* (2013.01); *F21V 21/0885* (2013.01); *F21V 23/04* (2013.01); *F21V 23/06* (2013.01); *F21V 31/005* (2013.01); *F21Y 2115/10* (2016.08)

(58) Field of Classification Search
CPC ......... F21Y 2101/02; F21K 9/00; F21S 4/001
USPC .......................................................... 362/227
See application file for complete search history.

(56) References Cited

U.S. PATENT DOCUMENTS

| | | | | |
|---|---|---|---|---|
| 2005/0180130 | A1* | 8/2005 | Harris, Jr. ............... | F21L 4/025 362/184 |
| 2009/0190332 | A1* | 7/2009 | Sharrah ................... | F21L 4/025 362/105 |
| 2015/0049513 | A1* | 2/2015 | Haubach ................. | F21V 19/04 362/648 |
| 2017/0284646 | A1* | 10/2017 | Arena ..................... | F21V 23/06 |
| 2018/0073710 | A1* | 3/2018 | Van Den Steen ....... | F21V 21/29 |

* cited by examiner

*Primary Examiner* — Ahshik Kim
(74) *Attorney, Agent, or Firm* — David M. Breiner; BrownWinick Law Firm

(57) ABSTRACT

In accordance with at least one example embodiments, a swivel lamp may include a primary housing, a lamp housing enclosing at least one light emitting member at a first end of the lamp housing and at least one light emitting member at a second end of the lamp housing, and a switch configured to control power to the light emitting members.

8 Claims, 14 Drawing Sheets

SWIVEL LAMP

BACKGROUND

1. Field

Example embodiments relate to a swivel lamp and a flashlight comprising the swivel lamp.

2. Description of the Prior Art

Various types of flashlights are well known in the art. Many of the flashlights incorporate relatively complex electrical and mechanical connections that complicate the manufacture and assembly of such flashlights. The complex configurations tend to reduce the reliability of such flashlights while increasing the cost of the flashlights to the consumers.

SUMMARY

Example embodiments relate to a swivel lamp and a flashlight that uses the swivel lamp.

In accordance with at least one example embodiment, a swivel lamp may include a primary housing, a lamp housing enclosing at least one light emitting member at a first end of the lamp housing and at least one light emitting member at a second end of the lamp housing, and a switch configured to control power to the light emitting members.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1A:
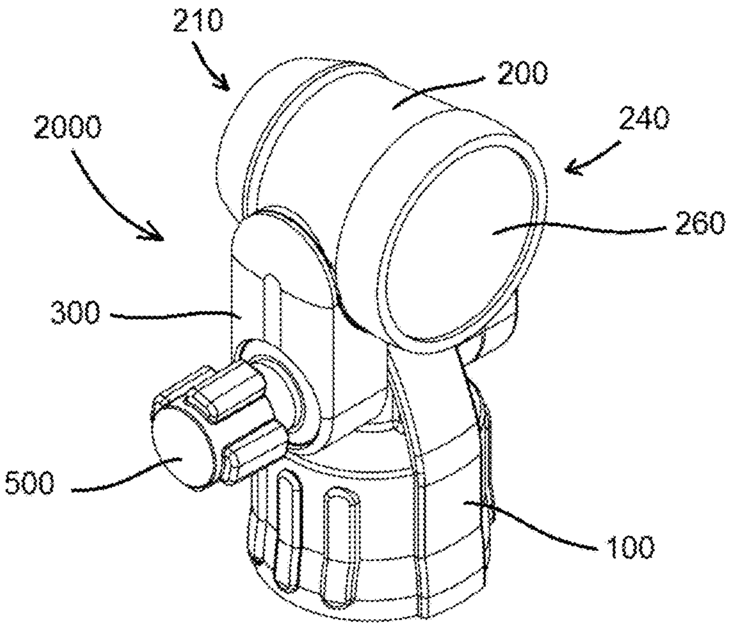
FIGS. 1A-1F are various views of a swivel lamp.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to swivel lamp and a flashlight utilizing the swivel lamp.

Figure 1B:
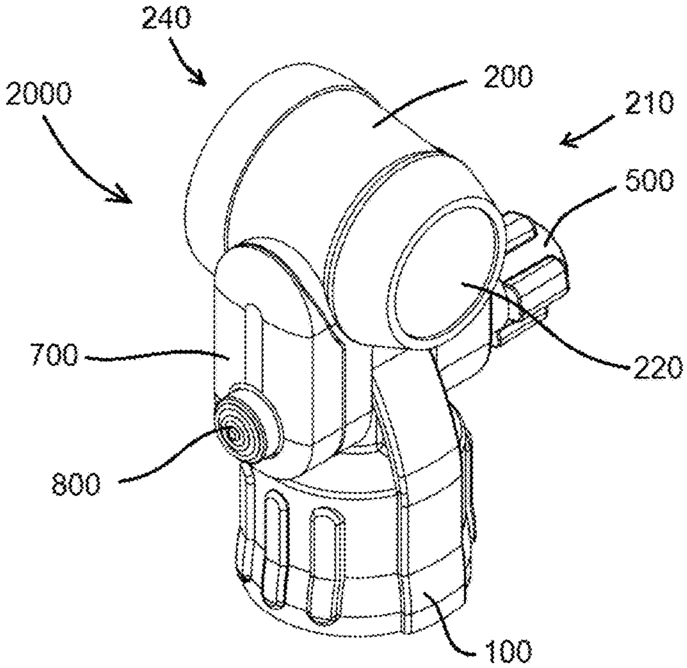
Figure 1C:
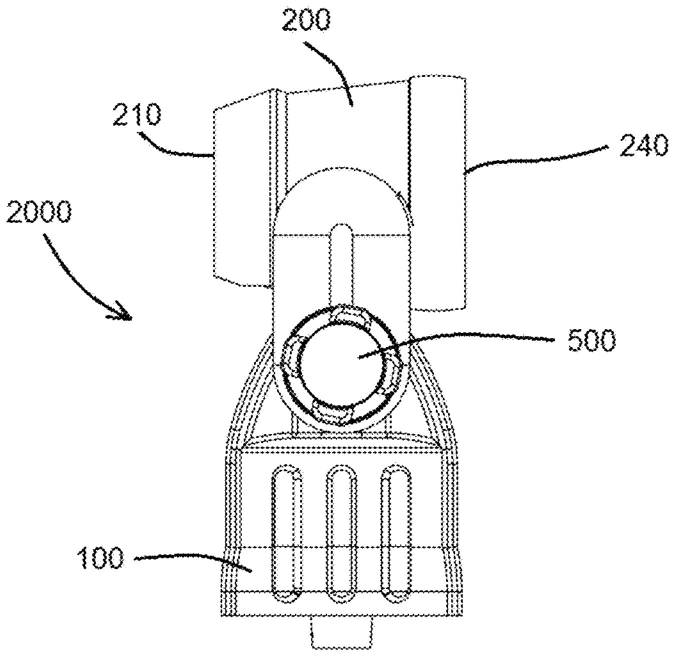
Figure 1D:
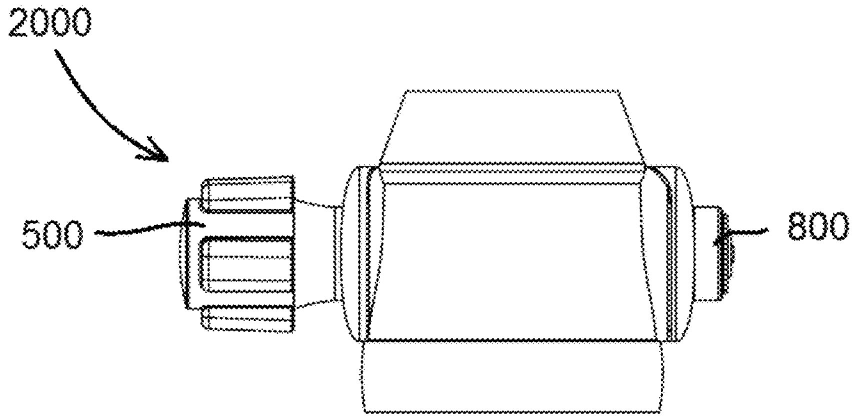
Figure 1E:
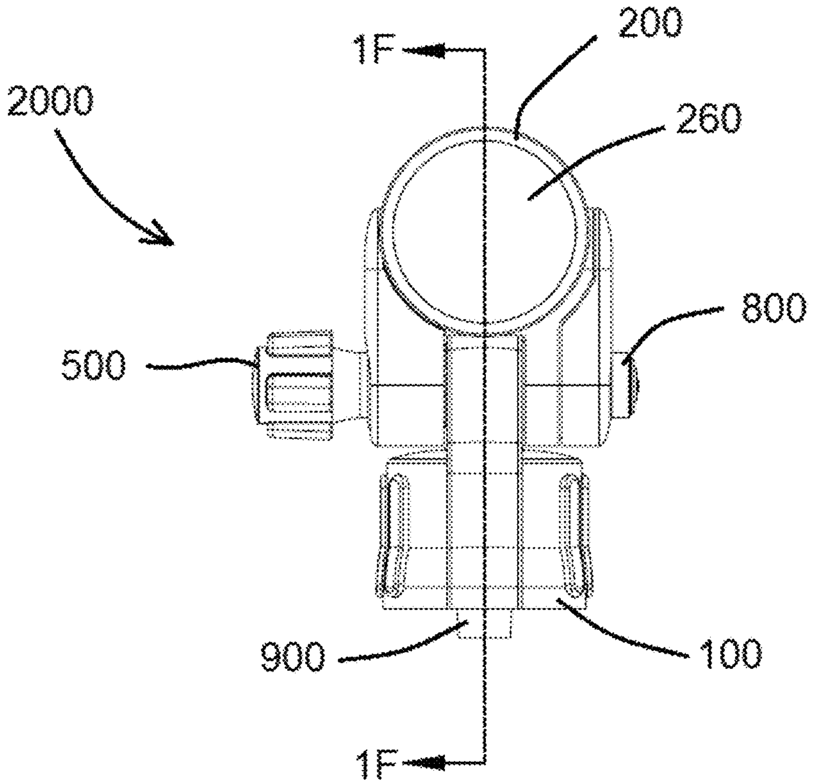
Figure 1F:
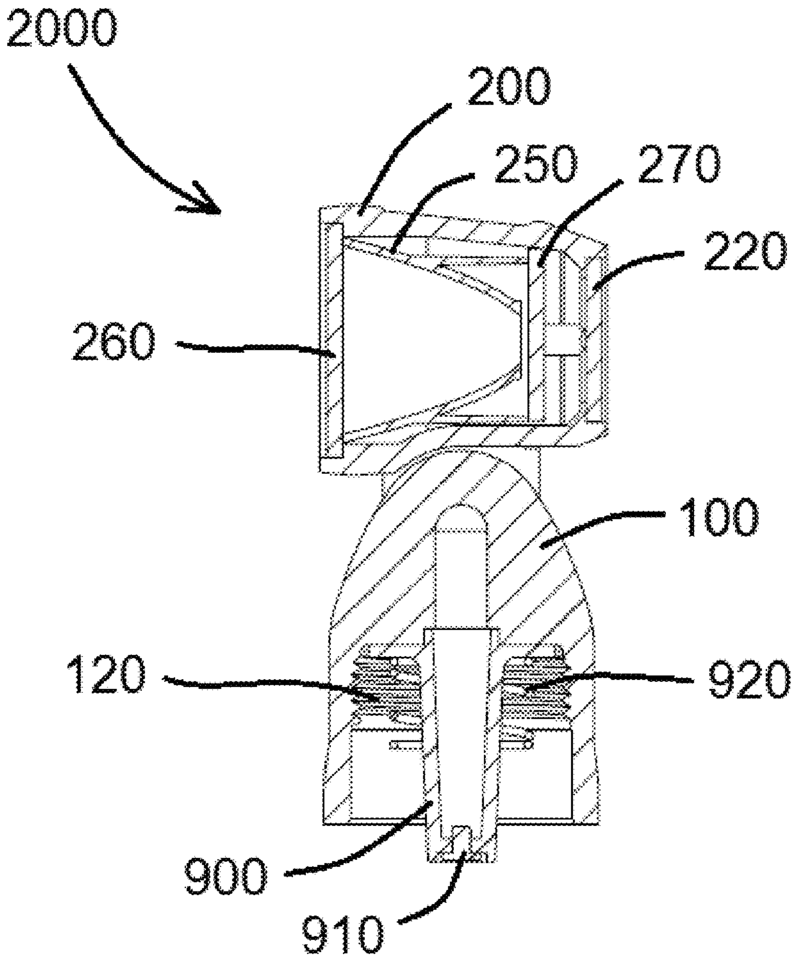
Figure 2A:
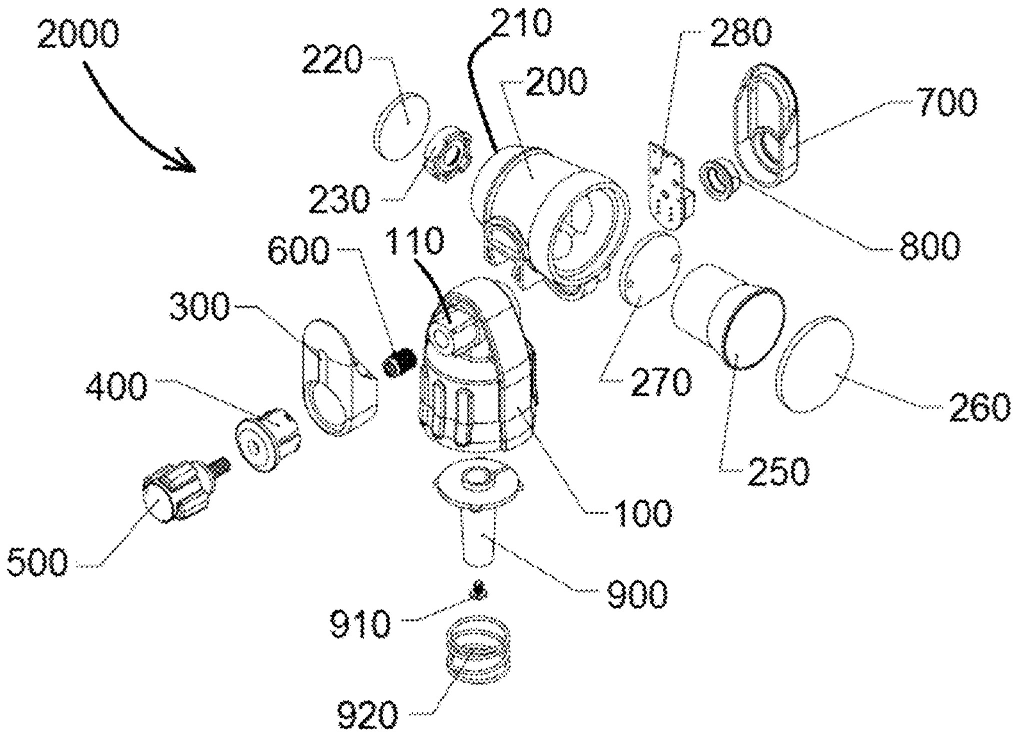
FIGS. 2A-2B are exploded views of the example swivel lamp.
Figure 2B:
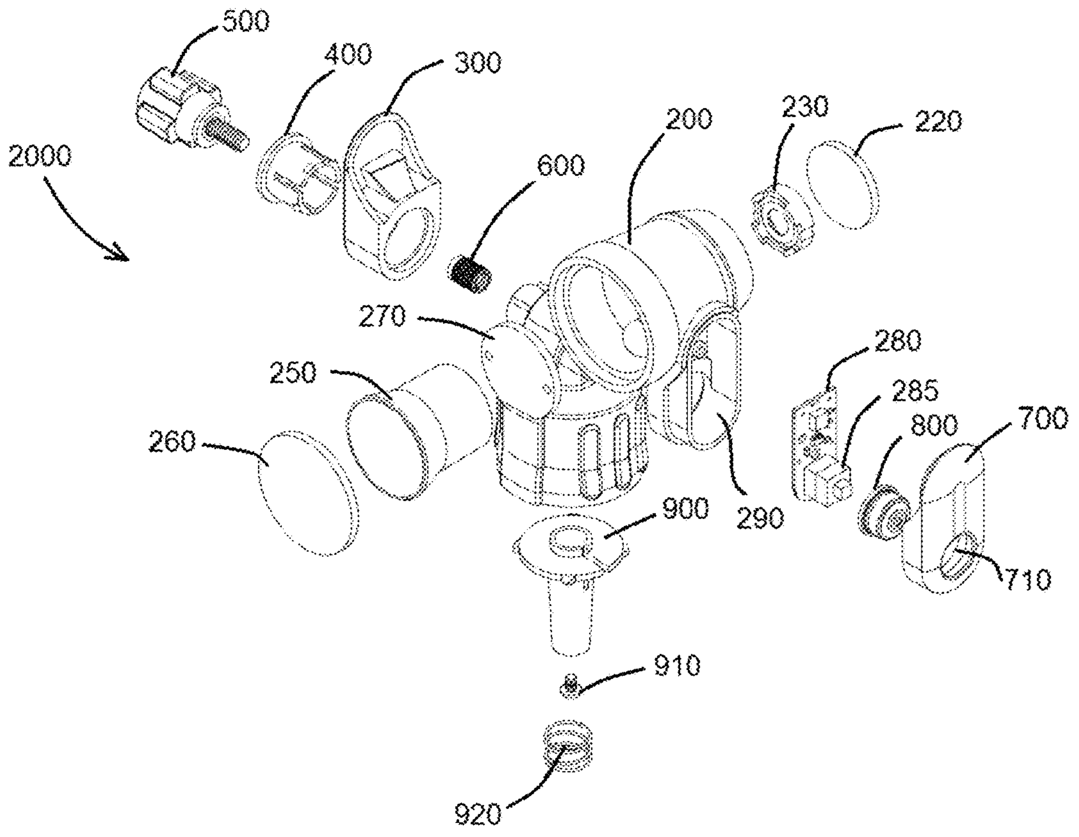

FIGS. 1A-1F are various views of a swivel lamp 2000 in accordance with example embodiments. More specifically, FIG. 1A illustrates a first perspective view of the swivel lamp 2000, FIG. 1B illustrates a second perspective view of the swivel lamp 2000, FIG. 1C illustrates a first side view of the swivel lamp 2000, FIG. 1D illustrates a top view of the swivel lamp 2000, FIG. 1E illustrates a front view of the swivel lamp 2000, and FIG. 1F illustrates a section view of the swivel lamp 2000. FIGS. 2A-2B illustrate two exploded views of the swivel lamp 2000.

Referring to FIGS. 1A-2B it is observed the swivel lamp 2000 in accordance with example embodiments may be comprised of a primary housing 100 and a lamp housing 200. The lamp housing 200, as will be shown, may enclose light emitting members, for example light emitting diodes (LEDs), which may generate light. The lamp housing 200 may also be configured to emit light in two different directions. For example, in at least one embodiment the lamp housing 200 may emit light from a front side 240 of the lamp housing 200 and emit light from a rear side 210 of the lamp housing 200. Also, in at least one example embodiment, the lamp housing 200 may be pivotally connected to the primary housing 100 and therefore the swivel lamp 2000 may assume more than one configuration. That is, the lamp housing 200 may be tilted with respect to the primary housing 100.

In example embodiments swivel lamp 2000 may include a hinge cover 300 which may be part of a clutch system that controls an amount of force necessary to tilt the lamp housing 200 with respect to the primary housing 100. In at least one embodiment, the hinge cover 300 may also at least partially secure the lamp housing 200 to the primary housing 100. The hinge cover 300, in turn, may be secured to the primary housing 100 by a brake member 400 and a threaded member 500 which may each be part of the clutch system. In at least one example embodiment the threaded member 500 may interface with an internally threaded insert 600 which may be inserted into a cylindrical protrusion 110 of the primary housing 100.

In example embodiments the lamp housing 200 may resemble a tubular member which houses various elements. For example, the rear side 210 of the housing 200 may include a rear lens 220 and a diverging reflector 230 and the front side 240 of the housing 200 may house a parabolic reflector 250 and a front lens 260. In example embodiments the lamp housing 200 may enclose additional elements, for example, a light emitting diode printed circuit board assembly (LED PCBA) 270 which may include one or more light emitting diodes. The lamp housing 200 may also include additional elements such as a switch PCBA 280 which may include a switch 285 to turn on or off the light emitting diodes of the LED PCBA 270. In one particular nonlimiting example embodiment at least one diode may be arranged in the rear side 210 of the housing 200 so that light may be generated and displayed through the rear lens 220. In this embodiment at least one diode may also be arranged in the front side 240 of the housing 200 so that light may be generated and displayed through the front lens 260. In this particular example embodiment, the at least one diode arranged in the rear side 210 of the housing 200 along with the diverging reflector 230 and rear lens 220 may generate a light having a different color or a wider angle than the light generated by the at least one diode in the front side 240 of the housing 200.

The lamp housing 200 may include an opening 290 (see FIG. 2B) which may allow the switch PCBA 280 to be inserted into the lamp housing 200. The opening 290 may be covered by a switch cover 700 which may be fit over the opening 290 and close the opening 290. The switch cover 700 may be secured to the lamp housing 200 by an adhesive or fastener such as screw. In another embodiment edges of the switch cover 700 may be configured to snap onto edges of the lamp housing 200 surrounding the opening 290. The switch cover 700 may include an opening 710 which may expose the switch 285 of the switch PCBA 280 so that an operator may press the switch 285 to activate the LEDs of the LED PCBA 270 (as well as activate any LEDs that may be in the front 210 or rear 240 of the lamp housing 200). Though not required, a button depressor 800 may be provided to cover and protect the switch 285. The button depressor 800 may resemble an elastic member, for example, rubber, and may act to not only allow an operator to operate the switch 285 but may act as a water proof seal to seal the opening 710.

In example embodiments the primary housing 100 may have internal threads 120 as shown in FIG. 1F. The internal threads 120 may be configured to engage external threads of a cylindrical member which may enclose batteries. In example embodiments the primary housing 100 may also enclose a contact insulator 900 which may support a battery positive contact stud 910 as shown in FIG. 1F. Also, in example embodiments, the primary housing 100 may also include a battery negative contact spring 920. Due to the presence of the positive contact stud 910 and the battery negative contact spring 920 electrical contact between batteries of the cylindrical member and the positive contact stud 910 and negative contact spring 920 may be maintained even when the primary housing 1000 is rotated 360 degrees with respect to the cylinder. Thus, not only can the housing 200 be tilted up and down with respect to the cylinder, but it can be rotated with respect to the cylinder and still remain operational.

Figure 3:
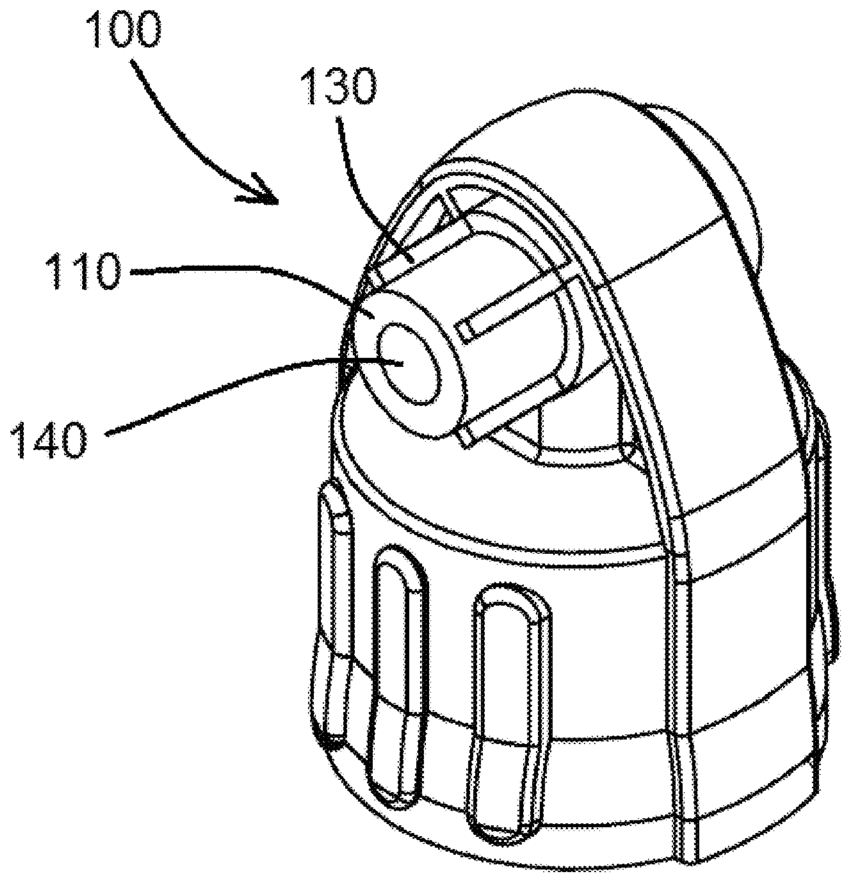
FIG. 3 is a view of a primary housing in accordance with example embodiments.
Figure 4:
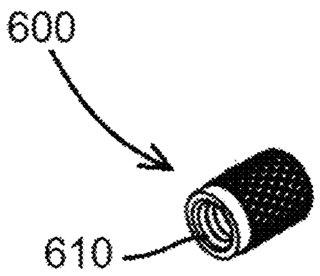
FIG. 4 is a view of an insert in accordance with example embodiments.
Figure 5A:
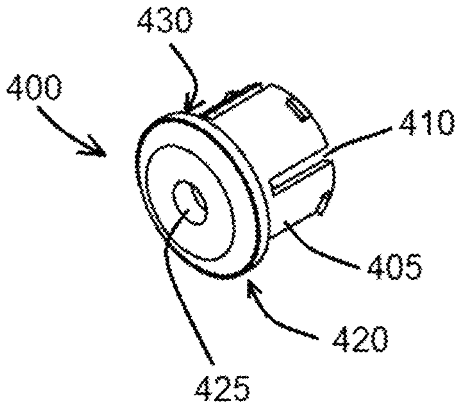
FIGS. 5A-5B are views of a brake in accordance with example embodiments.
Figure 5B:
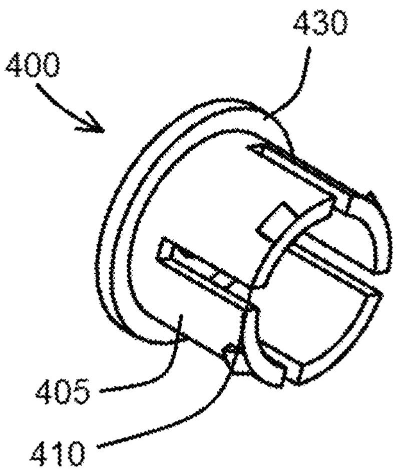
Figure 6:
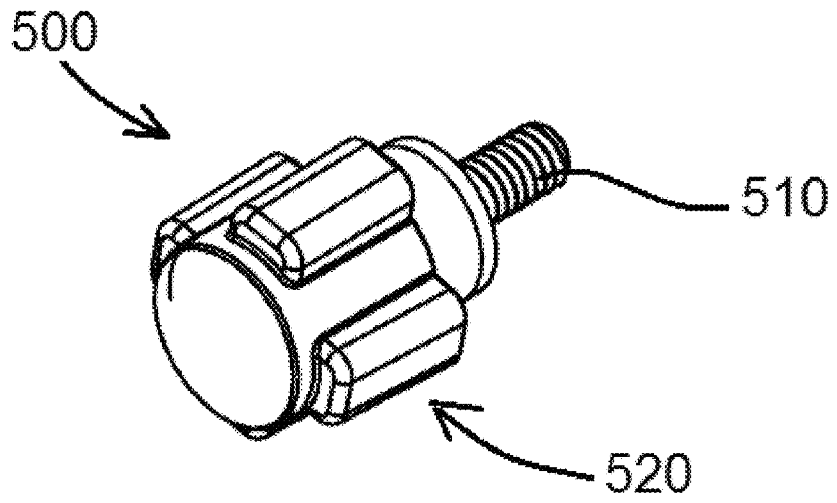
FIG. 6 is a view of a threaded member in accordance with example embodiments.
Figure 7A:
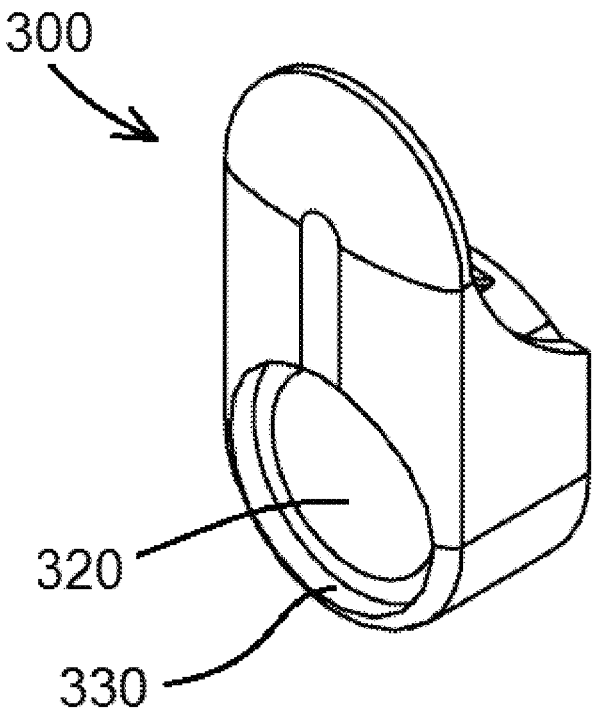
FIGS. 7A-7B are views of a hinge cover in accordance with example embodiments.
Figure 7B:
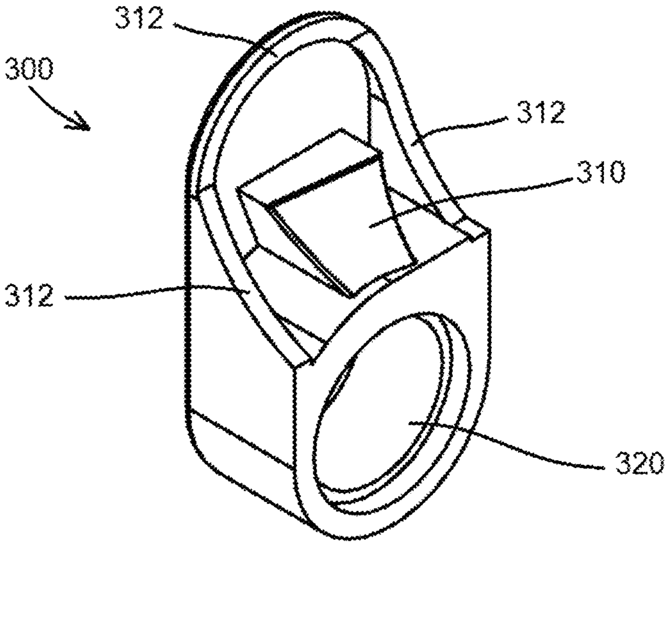
Figure 8A:
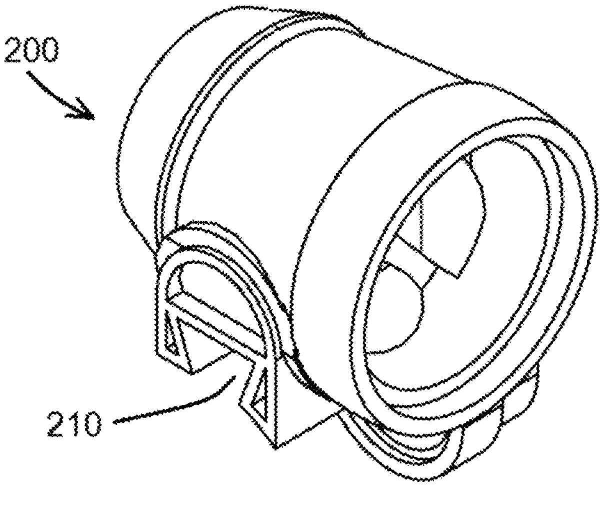
FIGS. 8A-8B are views of a lamp housing in accordance with example embodiments.
Figure 8B:
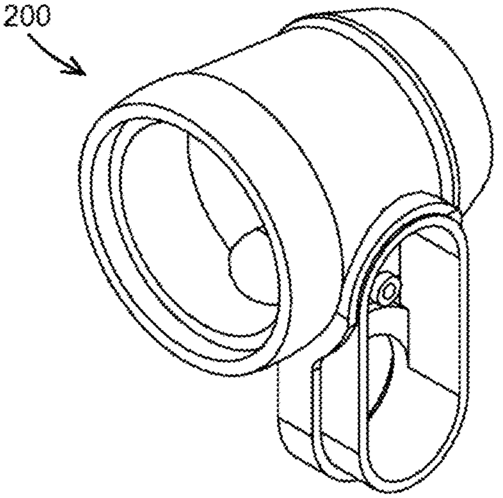

FIG. 3 is a close up view of the primary housing 100 in accordance with example embodiments. In example embodiments the primary housing 100 may have a cylindrical member 110 protruding from a body of the primary housing 100. In example embodiments the cylindrical member 110 may have an inner diameter of about the same size as an outer diameter of the threaded insert 600. As such, the threaded insert 600 may be inserted into the cylindrical member 110 of the housing 100. In example embodiments the threaded insert 600 may be press fit into the cylindrical member 110. As such, friction between the cylindrical member 110 of the housing 100 and the threaded insert 600 may prevent the threaded insert 600 from being pulled out of the cylindrical member 110 or prevented from rotating within the cylindrical member 110. Furthermore, in another embodiment, an adhesive may be added between the threaded insert 600 and the inner walls of the cylindrical member 110 in order to better secure the threaded insert 600 in the cylindrical member 110. It is understood, however, that in other embodiments the threaded insert 600 may be omitted and the cylindrical member 110 may be modified to include internal threads and, as such, may serve the same purpose as the threaded insert 600.

In example embodiments the cylindrical member 110 may be configured to interface with the brake 400. For example, the brake 400 may include a substantially hollow body 405 having an annular cross-section. The annular cross-section may have an inner diameter that is about the same size as, or slightly larger than, the outer diameter of the cylindrical member 100. As such, the body of the brake 400 may fit over the cylindrical member 110. Furthermore, the cylindrical member 110 may include a plurality of protrusions 130 protruding therefrom and the body 405 may include slots 410 which may be configured to receive the plurality of protrusions. For example, the body 405 of the brake may have four slots 410 formed therein and the width and spacing of the slots 410 may be substantially the same as the width and spacing of the protrusions 130 formed on the cylindrical member 110. However, in example embodiments the length of the slots 410 and the protrusions 130 may not be the same. For example, in example embodiments the slots 410 may be, but are not required to be, shorter than the lengths of the protrusions 130.

In example embodiments threaded member 500 and the brake 400 may pivotally attach the hinge cover 300 to the primary housing 100. Furthermore, the hinge cover 300 may be configured to attach to the lamp housing 200. In at least one example embodiment, the hinge cover 300 and the lamp housing 200 may rotate as a unit with respect to the primary housing 100. For example, in example embodiments the hinge cover 300 may include a wedge shaped protrusion 310 and the lamp housing 200 may include a receiving space 212 configured to receive the wedge shaped protrusion 310. In this sense the hinge cover 300 may plug into the lamp housing 200 via the wedge shaped protrusion 310 and the receiving space 212. In addition to the wedge shaped protrusion 310, the hinge cover 300 may include walls 312 contoured to interface with an outside surface of the lamp housing 200. As such, the interface between the hinge cover 300 and the lamp housing 200 may be substantially water proof when properly connected together. Of course, in example embodiments, additional members, such as gaskets, may be provided to ensure the connections are waterproof is so desired.

In example embodiments the hinge cover 300 may include a passage 320 having a diameter large enough to allow the body 405 of the brake 400 to pass through but small enough to prevent a head 420 of the brake 400 to pass through. In example embodiments, the hinge cover 300 may include a recessed area 330 into which the head 420 of the brake 400 may be inserted. Though not shown in the figures, an O-ring may be arranged in the recessed area 330 to provide a seal between the brake 400 and the hinge cover 300. In addition, the O-ring may be made of a relatively high friction member, for example, rubber, which may increase friction between the brake 400 and the hinge cover 300. The friction may resist rotation of the hinge 300 with respect to the brake 400. In example embodiments, the passage 320 may resemble a cylindrical passage having a diameter about the same size as or larger than the outer diameter of the body 405 of the brake 400. Thus, the hinge cover 300 may rotate about the brake 400.

In example embodiments the threaded member 500 may have a threaded body 510 with threads configured to engage the threads of the insert 600. The threaded member 500 may also include a grip 520 configured to be gripped by the human hand. As such, the threaded member 500 may be easily manipulated by an operator. In at least one example embodiment, the threaded member 500 may secure the brake member 400 in place. For example, in example embodiments, the threaded insert 600 may be inserted in the cylindrical member 110 of the primary housing 100. The hinge cover 300 may be arranged so that the passage 320 is substantially aligned with the threaded insert 600. The body 405 of the brake 400 may then be inserted through the passage 320 and manipulated so the protrusions 130 of the cylindrical member 110 are inserted into the slots 405 of the brake and so that the head 420 of the brake 400 is in the recess 330 of the hinge cover 300. The threaded body 510 of the threaded member 500 may be inserted through an aperture 425 of the brake 400 and into the threaded insert 600. Turning the threaded member 500 advances the threaded member 500 towards the primary housing 100. Continued turning presses the threaded member 500 into the brake 400 forcing the brake 400 against the hinge cover 300. This action increases friction force between the hinge cover 300 and the brake 400 thus providing resistance against any turning moment applied to the hinge cover 300 or the lamp housing 200 to which it is connected. The amount of resistance, of course, can be adjusted by tightening or loosening the threaded member 500. Tightening the threaded member 500 would make it more difficult for an operator to rotate the hinge cover 300 with respect to the primary housing 100 and loosening the threaded member 500 would make it easier for an operator to move the hinge cover 300 with respect to the primary housing 100.

Figure 9:
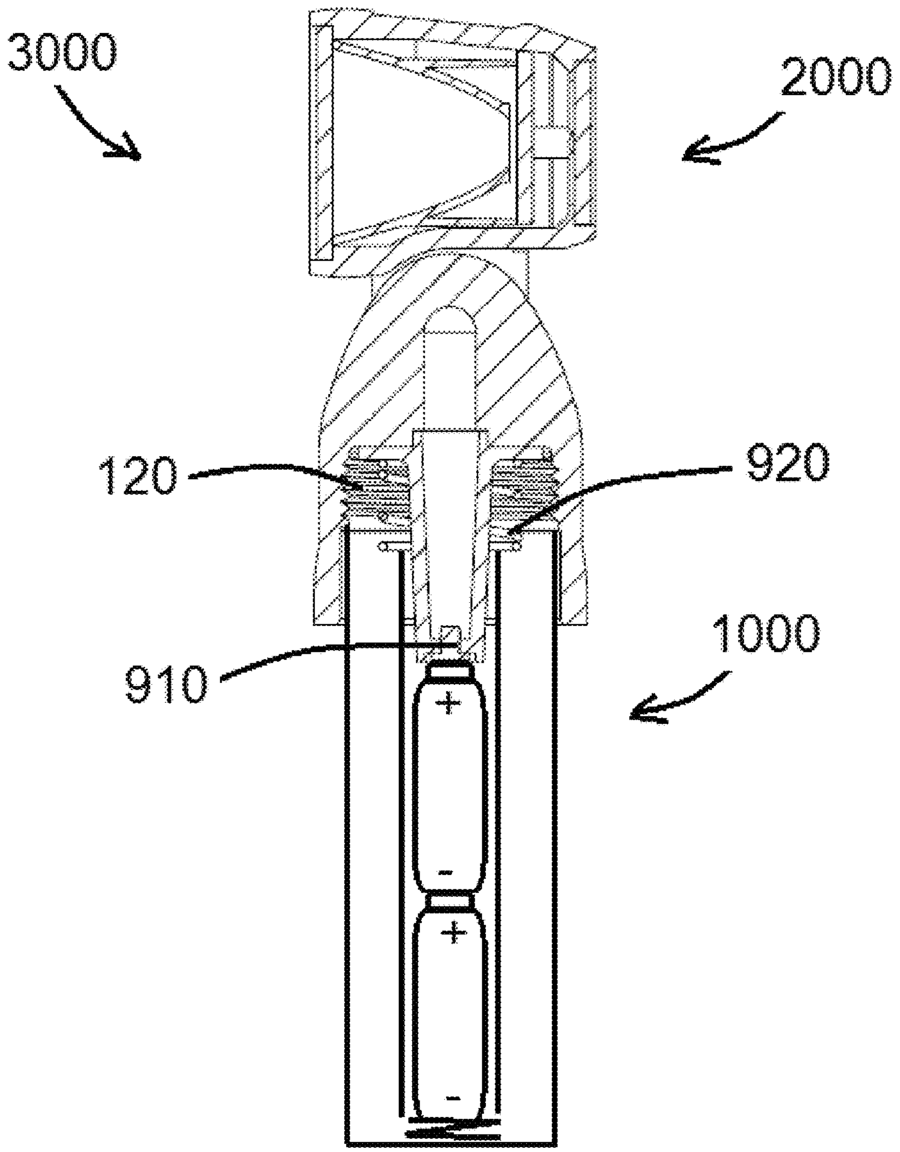
FIG. 9 is a view of a system in accordance with example embodiments.

FIG. 9 is a view of a system 3000 in accordance with example embodiments. In example embodiments the system 3000 is comprised of the swivel lamp 2000 and a tube 1000. In FIG. 9 the tube 1000 includes threads engaged with the threads 120 of the primary housing 1000. As shown in FIG. 9 the tube 1000 encloses a pair of batteries (however, it is understood the tube 1000 may include only a single battery or more than two batteries). As shown in FIG. 9 the positive terminal of the batteries contacts the battery positive contact stud 910 and a conductive member (not shown) from the negative terminal of the bottom displayed battery is connected to the battery negative contact spring 920. Wires (not shown) from each of the battery positive contact stud 910 and the battery negative contact spring 920 pass through the primary housing 100 and into the lamp housing 200 where they connect to the switch PCBA 280. In the event the switch 285 of the switch PCBA 280 is in an on position power flows from the PCBA 280 to the LED PCBA 270 to power the LEDs of the LED PCBA 270. In the event the switch 285 of the switch PCBA 280 is in an off position power from the batteries to the LED PCBA 270 is interrupted thereby preventing the LEDs of the LED PCBA 270 from generating light.

Figure 10A:
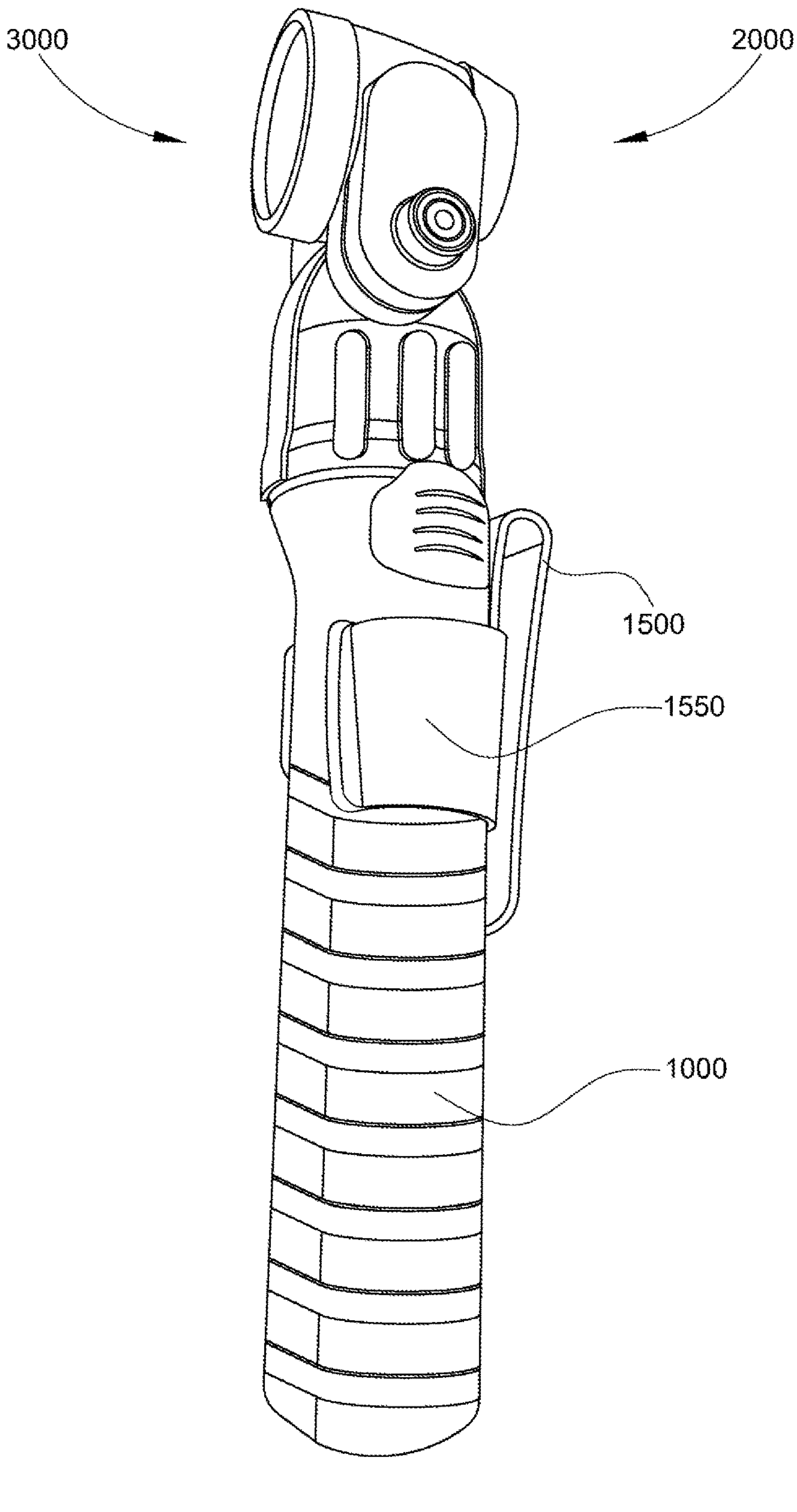
FIGS. 10A and 10B are views of a system in accordance with example embodiments.
Figure 10B:
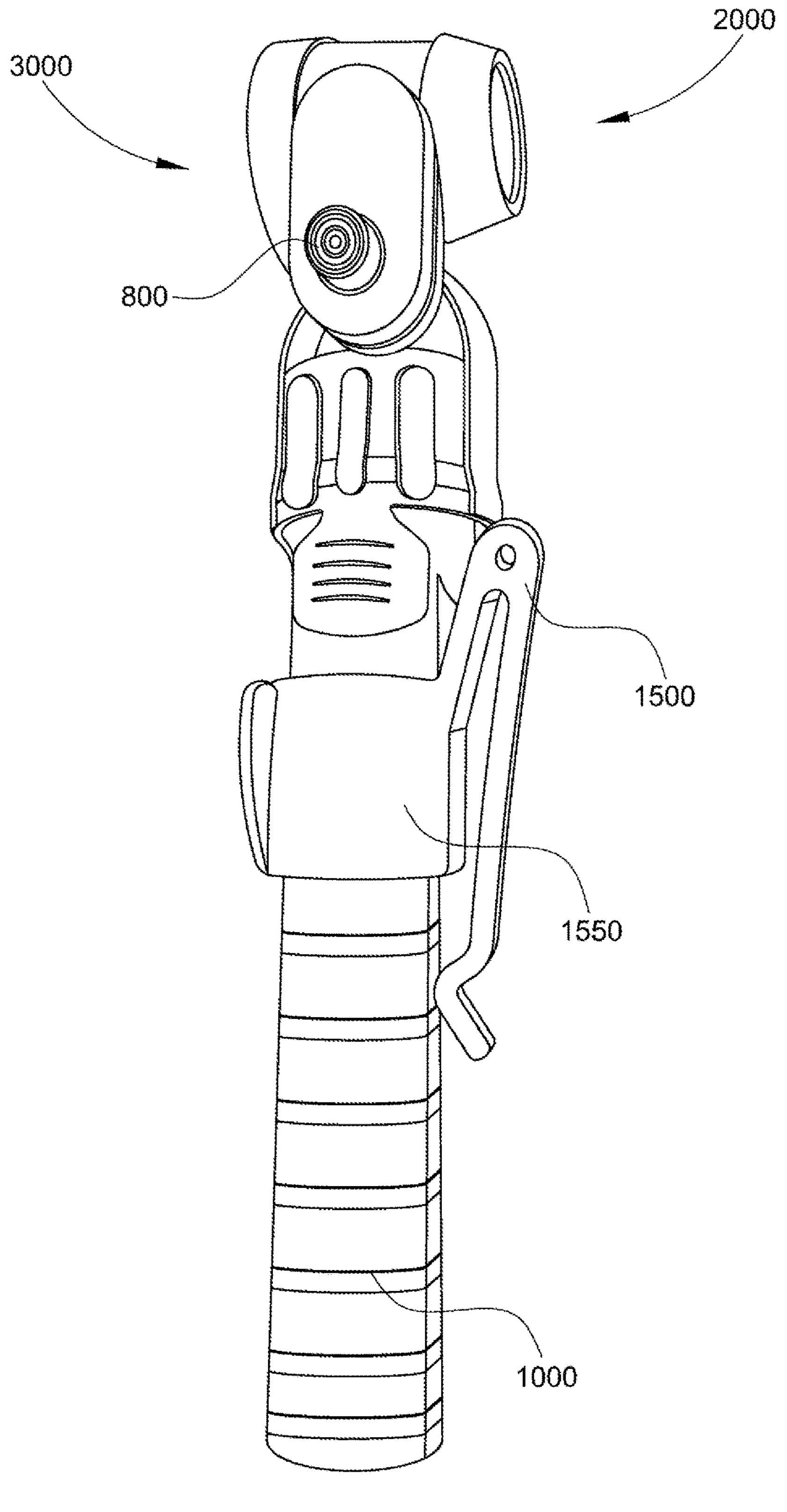

FIGS. 10A and 10B illustrate the system 3000 with an additional modification. In FIGS. 10A and 10B the system further includes a clip 1500 connected to the tube 1000 via a wrap-around collar 1550. The clip 1500 may allow an operator to connect the system 3000 to a pocket, a belt, or a piece of equipment. Also, for purposes of clarity, FIGS. 10A and 10B illustrate the swivel lamp being oriented in two different directions. In FIG. 10A, for example, the lamp housing 200 is illustrated as being tipped upward with respect to the primary housing 1000. In FIG. 10B the lamp housing 200 is illustrated as being tipped downward with respect to the primary housing 1000.

It is understood that the electrical system of example embodiments may be configured in any number of ways. For example, the electrical system may be configured so that if the button 285 of the swivel lamp 2000 is pressed once by an operator an LED arranged to shine light out of the front side 240 of the lamp housing 200 is activated. If the button 285 is pressed again by the operator the LED arranged to shine light out of the front side 240 of the housing 200 may be deactivated and an LED arranged to shine light out or the rear side 210 of the lamp housing 200 may be activated to shine light out of the rear side 210 of the housing 200. The electrical system may be further configured so that if the button 285 is pressed again, the LED arranged to shine light out of the rear side 210 of the housing 200 may be deactivated. In the alternative, pressing the button 285 a third time may send power to LEDS arranged to shine light out of the front 210 and rear 240 sides of the lamp housing 200 and pressing the button a fourth time may deactivate all LEDS in the lamp housing.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the claims.

What is claimed is:

1. A swivel lamp comprising:

a primary housing;

a lamp housing pivotally connected to the primary housing, the lamp housing enclosing at least one light emitting member at a first end of the lamp and at least one light emitting member at a second end of the lamp housing;

a switch configured to control power to the light emitting members;

a hinge cover connected to the lamp housing;

a brake extending through the hinge cover; and a threaded member extending through the hinge cover and the brake to the threaded member of the lamp housing to pivotally secure the primary housing to the lamp housing, wherein the lamp housing includes an internally threaded member.

2. The swivel lamp of claim 1, wherein the internally threaded member is an internally threaded cylindrical structure of the primary housing.

3. The swivel lamp of claim 1, wherein the lamp housing includes a receiving space and the hinge cover includes a protrusion protruding into the receiving space to connect the hinge cover to the lamp housing.

4. The swivel lamp of claim 1, wherein the primary housing includes a contact stud and a contact spring around the contact stud.

5. A swivel lamp comprising:

a primary housing;

a lamp housing pivotally connected to the primary housing, the lamp housing enclosing at least one light emitting member at a first end of the lamp and at least one light emitting member at a second end of the lamp housing; and a switch configured to control power to the light emitting members, wherein the primary housing includes at least one protrusion protruding into slots of the brake to prevent the brake from rotating with respect to the primary housing and the lamp housing includes an internally threaded member.

6. The swivel lamp of claim 5, wherein the hinge cover includes a recessed area into which a head of the brake may be inserted.

7. The swivel lamp of claim 6, wherein the head of the brake includes an opening into which at least a portion of the threaded member passes through.

8. The swivel lamp of claim 7, wherein the threaded member includes a grip allowing a user to rotate the threaded member.

* * * * *